INVENTORS
RAY D. STEWARD
FRED A. LEE
Paul O. Pippel
ATT'Y

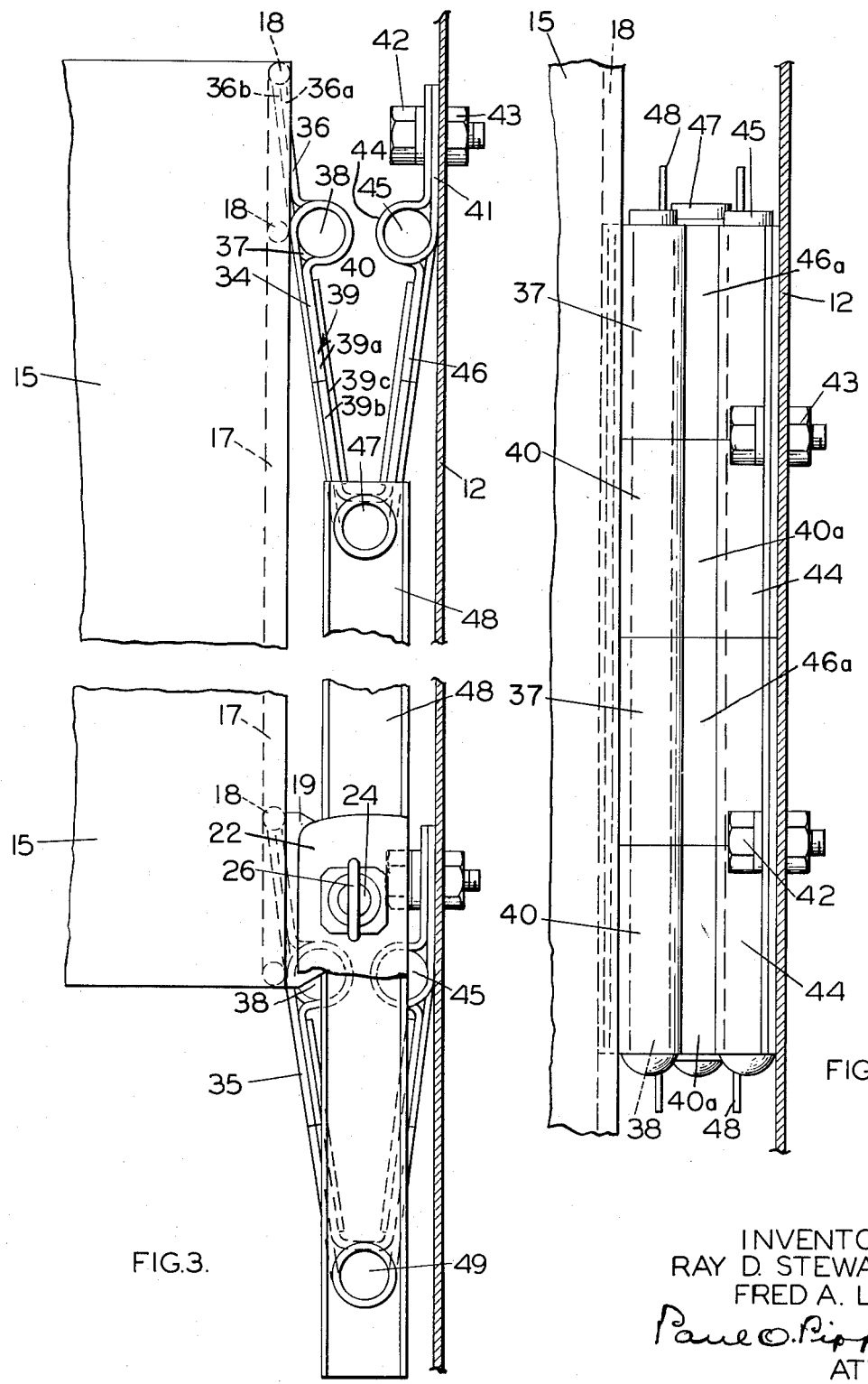

United States Patent Office 2,723,710
Patented Nov. 15, 1955

2,723,710

VEHICLE SEAT STRUCTURE

Ray D. Steward, Auburn, and Fred A. Lee, Fort Wayne, Ind., assignors to International Harvester Company, a corporation of New Jersey Application June 30, 1951, Serial No. 234,482

3 Claims. (Cl. 155—14)

This invention relates to an improved adjustable seat structure and more particularly to a novel, inexpensive seat structure for use in motor truck cabs which is longitudinally adjustable with respect to the cab.

The ordinary motor truck seat generally includes a bottom portion and a back rest portion which are usually constructed of a plurality of springs mounted on a spring frame. The spring frames, in turn, are rigidly fastened to a seat frame. The seat frame which is generally formed of tubular steel or channel-shaped members supports the spring frames and maintains the proper disposition of the bottom and back rest portions or cushions for comfortable driving of the vehicle. In motor vehicles provided with means for adjusting the seat longitudinally with respect to the vehicle cab or operator's compartment in order to accommodate differences in physical characteristics of various operators, the seat frame is moved as a unit. It is quite apparent that while the seat frame is a costly part of the vehicle seat structure, it is necessary in prior art constructions. The primary object of the present invention is to provide a motor truck cab seat structure which is adjustable longitudinally with respect to the cab and does away with the need for a seat frame.

Another object is the provision of an adjustable seat for the driver of a motor truck which is simple to construct and yet is highly rugged and sturdy.

Still another object is to provide a toggle mechanism uniquely disposed between the seat back portion and the back panel of the vehicle cab for transmitting a portion of the longitudinal, rearward forces, caused by the operator pushing against the back portion, to the back panel of the cab.

A further object is to provide an inexpensive adjustable locking means for securing the seat structure in any one of a number of longitudinal positions with respect to the floor and back panels of the vehicle cab.

The foregoing and other important objects and desirable features inherent in and encompassed by the invention, together with many of the purposes and uses thereof, will become readily apparent from a reading of the ensuing description in conjunction with the annexed drawing, in which, Figure 1 is a side elevational view of a vehicle cab, partially broken away, showing an adjustable seat structure incorporated therein;

Figure 3 is an enlarged fragmentary view of the connecting means between the back rest portion of the vehicle seat structure and the back panel of the vehicle cab; and Figure 4 is an enlarged plan view of one-half of the connecting means shown in Figure 3.

Figure 1:
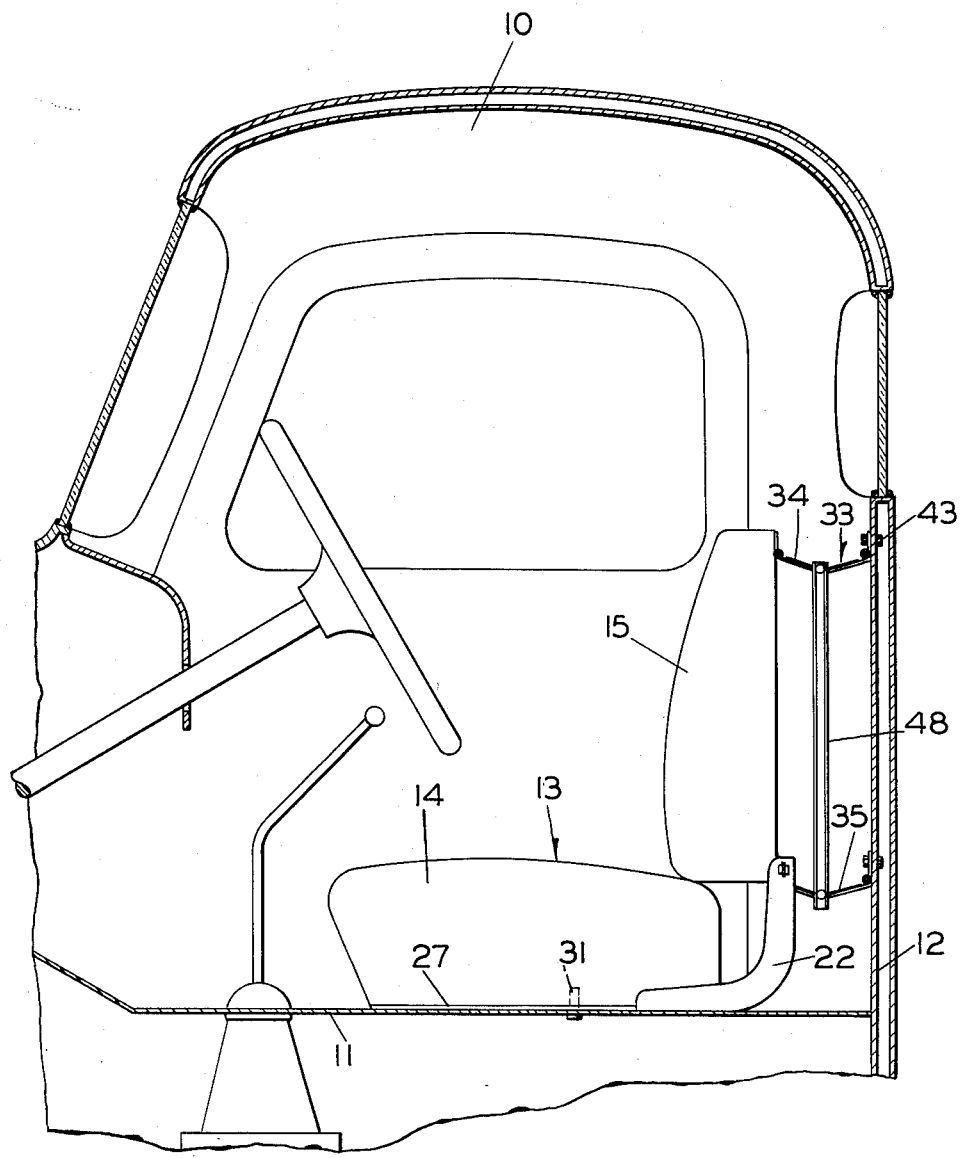
Figure 2:
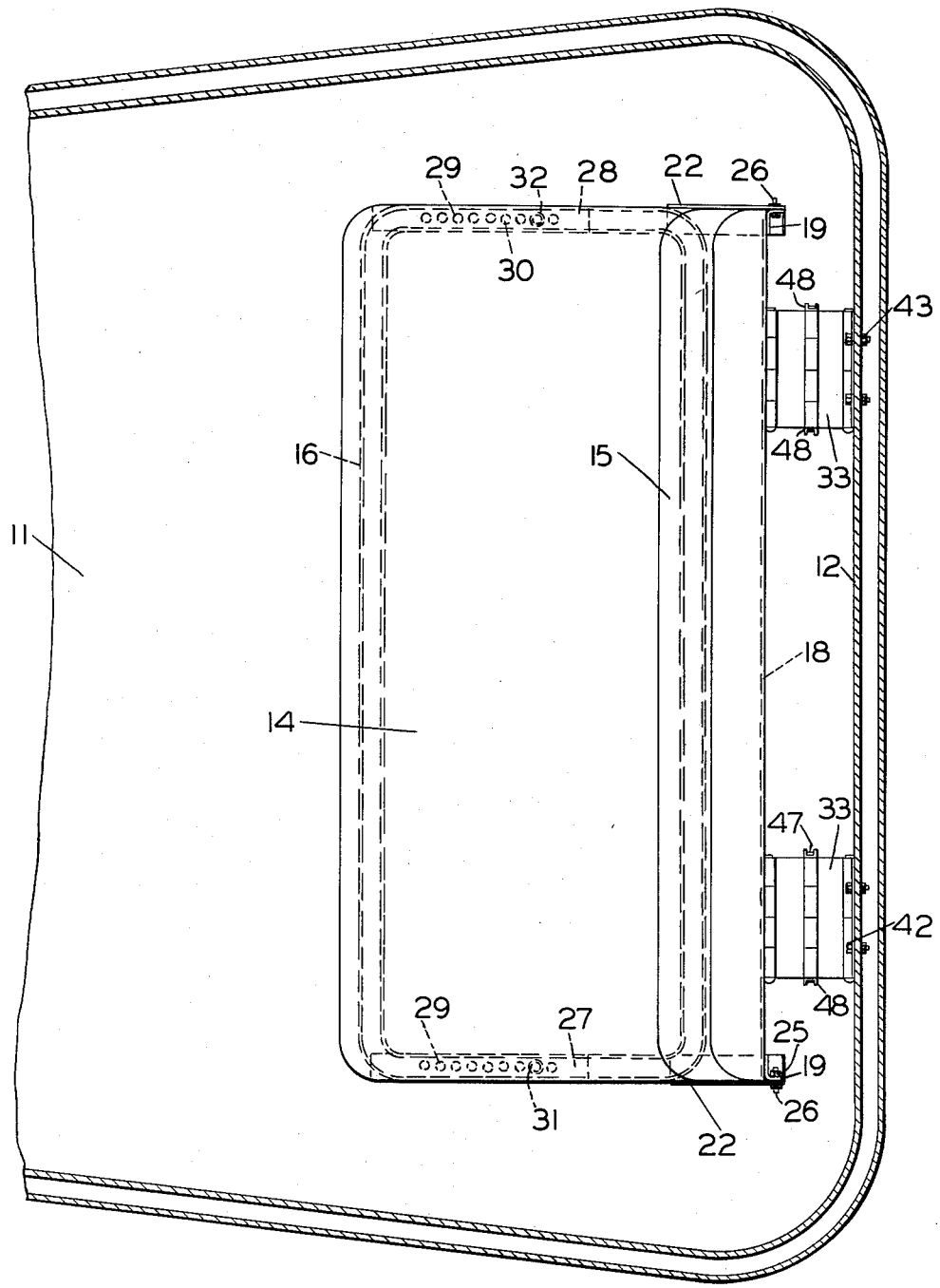
Figure 2 is a plan view of the vehicle cab with the roof removed to better illustrate the seat structure.

Referring to the drawings wherein like reference characters represent like elements throughout the various views, there is shown a rear fragmentary portion of a motor truck cab or operator's compartment 10 which includes a horizontally disposed sheet metal floor panel 11 having its rearward marginal edge rigidly fastened, as by welding or the like, to a vertically disposed back panel 12. The operator's seat 13 includes a horizontal bottom portion 14 extending transversely across the vehicle cab 10 and a generally upright back rest portion 15. The bottom and back portions 14, 15 are formed, as in conventional cushions, by fastening a plurality of fabric covered helical spring members (not shown) to spring frames 16 and 17, respectively. The spring frames 16, 17 are each made up of a pair of rectangularly-formed rods 18, as best shown in Fig. 2. Each side of the rectangle formed by each rod 18 is parallel and spaced from a respective side of the rectangle formed by the other rod 18. Rigidly fixed to the lowermost corners (as viewed in Fig. 1) of the back rest spring frame 17 are L-shaped brackets 19. The rearwardly extending legs of the brackets 19 are provided with apertures for a purpose which will be explained hereinafter.

Securely fastened on opposite sides of the spring frame 16 adjacent its rearward marginal edge are a pair of substantially L-shaped members 22. The members 22 extend upwardly and are provided with apertures alignable with the apertures formed in the brackets 19. The bottom and back portions 14 and 15 are connected together by means of a pair of horizontally disposed pivot pins 24 passing through the apertures formed in brackets 19 and members 22. Each pin 24 has one end threaded for engaging a securing nut 25 and its opposite end provided with a thumb portion 26 for readily tightening or loosening the pivotal connection between the bottom and back portions 14 and 15. It will be apparent that the members 22 constitute the sole direct connection means between the bottom portion 14 and the back portion 15 and the usual seat frame, generally found in prior art seat constructions for connecting the same portions together, is eliminated.

Rigidly fastened to the underside of the spring frame 16 along each side thereof are longitudinally extending adjusting plates 27, 28. A row of pin-receiving apertures 29, 30 are formed in the plates 27 and 28, respectively, and represent different positions of longitudinal adjustment of the operator's seat 13 with respect to the vehicle cab 10. It will be noted that each aperture 29 in plate 27 is in transverse alignment with a corresponding aperture 30 in plate 28. A pair of upwardly projecting, transversely spaced locking pins 31, 32 are rigidly fastened to the sheet metal floor panel 11 and are adapted to readily extend through any one of the apertures 29 in plate 27 and a related aperture 30 in the other plate 28 to position the seat 13 within the vehicle cab 10 and effectively prevent relative longitudinal and transverse movement of the seat with respect to the floor panel 11.

Inasmuch as the present invention contemplates the elimination of the conventional seat frame which normally supports the back rest portion 15, novel toggle means, designated generally by numeral 33, are provided between the back rest portion and the vehicle cab back panel 12 for movably supporting the back portion. The toggle means 33 comprise a pair of upper toggle sets 34 and a pair of lower toggle sets 35. Only one toggle set 34 will be described in detail but it is to be understood that the other toggle sets are similarly constructed. The toggle sets are positioned, as best shown in Figs. 1 and 2, to extend between each corner of the back rest portion 15 and the back panel 12. Each toggle set 34 includes a connecting member or bracket 36 welded to the spring frame 17. The connecting member 36 is constructed of a single, relatively thin metal plate and is formed to provide a pair of reversely bent, abutting legs 36a, 36b and a pair of transversely spaced cylindrical bearing portions 37 adapted to receive and support a pivot pin 38, the ends of which are headed to retain the same in position. A plate-like toggle link 39 is pivotally connected to the spring frame 17 by means of a pair of spaced cylindrical bearing portions 40 formed on one end of the link 39 embracing the pivot pin 38. Each link 39 is fabricated from thin metal plate material and includes a pair of members 39a, 39b having their marginal edges abutting. A flat plate 39c is suitably secured to the members 39a and 39b to thus complete the link 39. It will be apparent that each member 39a, 39b is made in the same manner as connecting member 36 and the members 39a, 39b when rigidly connected together by plate 39c provide a link 39 having a pair of bearing portions 40 on one end and a similar pair of bearing portions 40a on its opposite end. A second connecting member 41 is attached to the vehicle cab back panel 12 by a pair of threaded bolts 42 and nuts 43. Connecting member 41 is constructed in exactly the same manner as connecting member 36. Like connecting member 36, the second connecting member 41 is provided with spaced bearing portions 44 for supporting a pivot pin 45 which in turn pivotally connects one end of a plate-like toggle link 46 in the same manner that link 39 is pivotally connected to the pivot pin 38. Link 46 is fabricated in the same manner as link 39. A pivot pin 47 forms the knee of the toggle set 34 by connecting the toggle links 39 and 46 together by extending through the bearing portions 40a of link 39 and bearing portions 46a of link 46. As best shown in Figs. 1 and 3, a pair of downwardly extending U-shaped links 48 have one end pivotally connected to pivot pin 47 and their opposite ends connected to a similar pin 49 forming the knee of one of the lower toggle sets 35. It will be obvious that relative movement of the back rest portion 15 with respect to the back panel 12 will tend to straighten or break the upper toggle sets 34 and the lower toggle sets 35 in unison by reason of the connecting links 48 extending between the knees of the toggle sets. Consequently, any force tending to break the upper toggle sets 34, as when the vehicle operator pushes rearwardly against the upper area of the back rest portion 15, will be partially transmitted to the lower toggle sets 35 through the connecting links 48 and will, likewise, tend to break the lower toggle sets. However, the lowermost corners of the back rest portion 15 are attached to the relatively fixed bottom portion 14 and since the lower toggle sets 35 are connected to the back rest portion 15 adjacent the lowermost corners thereof and the relatively fixed back panel 12 breaking of the lower toggle sets is prevented with the ultimate result that the upper toggle sets 34 are also prevented from breaking or collapsing.

When it is desired to change the longitudinal position of adjustment of the vehicle seat 13 with respect to the vehicle cab 10 pins 24 are unscrewed slightly to permit the forward edge of the bottom portion 14 to be raised by relatively swinging the same with respect to the back rest portion 15 about a horizontal axis through the pins 24. The bottom portion 14 is swung sufficiently to clear the adjusting plates 27, 28 from the locking pins 31, 32. The entire operator's seat 13 is then moved longitudinally to the position desired and the bottom portion 14 is lowered whereby the locking pins 31, 32 enter the apertures 29, 30 representing the particular position of adjustment chosen. Pins 24 are tightened to clamp the bottom and back portions 14, 15 together. It is apparent that the back portion 15 is always disposed correctly with respect to the bottom portion 14 to afford maximum comfort for the vehicle operator regardless of the adjusted position of the bottom portion.

The embodiment of the invention chosen for the purposes of illustration and description herein is that preferred for achieving the objects of the invention and developing the utility thereof in the most desirable manner, due regard being had to existing factors of economy, simplicity of design and construction, and the improvements sought to be effected. It will be appreciated, therefore, that the particular structural and functional aspects emphasized herein are not intended to exclude, but rather to suggest, such other adaptations and modifications of the invention as fall within the spirit and scope of the invention as defined in the appended claims.

What is claimed is:

1. An adjustable seat structure for a vehicle cab of the type having a floor panel and a vertical back panel comprising, in combination with said floor and back panels, a seat including a horizontally disposed bottom portion and a generally upright back portion; means for releasably securing said bottom portion to said floor panel in various positions of longitudinal adjustment with respect to said back panel; means for supporting said back portion including a pair of upper and a pair of lower sets of toggle links, each set comprising a first plate-like link pivotally connected to said back panel, a second plate-like link pivotally connected to said back portion, pivot means connecting said plate-like links together, and link means extending between and pivotally interconnecting the upper sets of toggle links and the lower sets of toggle links whereby said toggle links move in unison, and means for connecting said bottom portion to said back portion in the vicinity of the connection of the second plate-like links of said lower sets of toggle links to said back portion.

2. An adjustable seat structure for a vehicle cab of the type having a floor panel and a vertical back panel, comprising, in combination with said floor and back panels, a seat disposed within said cab including a bottom portion resting on said floor panel and a back portion; means for releasably securing said bottom portion to said floor panel in various longitudinal positions with respect to said back panel; and means for disposing said back portion at a predetermined angle with respect to said bottom portion, said back portion being movable with said bottom portion and said predetermined angular relationship between said bottom and back portions being maintained in each adjusted position of said bottom portion, said last-mentioned means including toggle means extending between and connecting portions of said back portions and said back panel, links interconnecting certain of said toggle means to constrain said toggle means to operate in unison, and means for connecting certain of said portions of said back portion to said bottom portion whereby said certain portions are relatively fixed to said bottom portion.

3. An adjustable seat structure for a vehicle cab of the type having a floor panel and a vertical back panel, comprising, in combination with said floor and back panels, a seat disposed within said cab including a bottom portion resting on said floor panel and a generally rectangular back portion; means for releasably securing said bottom portion to said floor panel in various positions of longitudinal adjustment with respect to said back panel; and means for disposing said back portion at a predetermined angle with respect to said bottom portion, said back portion being movable with said bottom portion and said predetermined angular relationship between said bottom and back portions being maintained in each adjusted position of said bottom portion, said last-mentioned means including toggle means extending between and connecting each corner of said back portion and said back panel, links interconnecting certain of said toggle means to constrain said toggle means to operate in unison, and means for connecting certain of the corners of said back portion to said bottom portion whereby said certain corners are relatively fixed to said bottom portion.

References Cited in the file of this patent
UNITED STATES PATENTS

| | | |
|---|---|---|
| 1,743,377 | Nadell | Jan. 14, 1930 |
| 1,799,871 | Seaman | Apr. 7, 1931 |
| 1,812,067 | Toncray | June 30, 1931 |
| 1,846,548 | Ganoung et al. | Feb. 23, 1932 |
| 2,100,170 | Parks | Nov. 23, 1937 |